(12) United States Patent
Stiscia et al.

(10) Patent No.: US 9,602,206 B2
(45) Date of Patent: *Mar. 21, 2017

(54) METHOD AND APPARATUS FOR RAMAN CROSS-TALK MITIGATION

(71) Applicant: ALCATEL LUCENT, Paris (FR)

(72) Inventors: James J. Stiscia, Murray Hill, NJ (US); Joe L. Smith, Murray Hill, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/586,087

(22) Filed: Dec. 30, 2014

(65) Prior Publication Data

US 2015/0110495 A1    Apr. 23, 2015

Related U.S. Application Data

(63) Continuation of application No. 13/527,697, filed on Jun. 20, 2012, now Pat. No. 8,923,696.

(60) Provisional application No. 61/557,719, filed on Nov. 9, 2011.

(51) Int. Cl.
*H04B 10/2507* (2013.01)
*H04B 10/2575* (2013.01)

(52) U.S. Cl.
CPC ... *H04B 10/2507* (2013.01); *H04B 10/25073* (2013.01); *H04B 10/2575* (2013.01); *H04B 10/25751* (2013.01)

(58) Field of Classification Search
CPC ............ H04B 10/2507; H04B 10/2575; H04B 10/25751; H04B 10/25073

USPC .. 398/67, 70–72, 192–195, 158, 159, 93–95
See application file for complete search history.

(56) References Cited

U.S. PATENT DOCUMENTS

| | | | |
|---|---|---|---|
| 7,330,667 B2* | 2/2008 | Fells | H04B 10/58 398/158 |
| 7,424,229 B2* | 9/2008 | Effenberger | H04B 10/2916 398/159 |
| 7,522,842 B1* | 4/2009 | McNicol | H04B 10/2916 398/157 |
| 8,374,508 B2* | 2/2013 | Soto | H04B 10/272 398/115 |
| 2006/0140639 A1* | 6/2006 | Effenberger | H04B 10/2916 398/159 |
| 2006/0257148 A1 | 11/2006 | Hirth | |
| 2008/0031621 A1 | 2/2008 | Kuo | |
| 2009/0238564 A1 | 9/2009 | Rohde | |

(Continued)

FOREIGN PATENT DOCUMENTS

CN     101167318 A    4/2008
CN     101755404 A    6/2010

(Continued)

*Primary Examiner* — Dalzid Singh
(74) *Attorney, Agent, or Firm* — RGIP LLC

(57) ABSTRACT

Disclosed are an apparatus and method configured to process video data signals operating on a passive optical network (PON). One example method of operation may include receiving a data signal at an optical distribution network node (ODN) and identifying signal interference in the data signal. The method may also include modifying a shape of the data signal in the electrical domain and transmitting the modified data signal to at least one optical termination unit (ONT).

17 Claims, 6 Drawing Sheets

(56) References Cited

U.S. PATENT DOCUMENTS

2012/0148261 A1* 6/2012 Yu ...................... H04B 10/548
                                                           398/193

FOREIGN PATENT DOCUMENTS

| JP | 2002141927 A | 5/2002 |
| JP | 2005-110091  | 4/2005 |
| JP | 2008-131592  | 5/2008 |

* cited by examiner

METHOD AND APPARATUS FOR RAMAN CROSS-TALK MITIGATION

CROSS-REFERENCE TO RELATED APPLICATIONS

This application is a continuation of U.S. patent application Ser. No. 13/527,697 entitled METHOD AND APPARATUS FOR RAMAN CROSS-TALK MITIGATION, filed Jun. 20, 2012, now issued U.S. Pat. No. 8,923,696, issued on Dec. 30, 2014, which in turn claims priority to U.S. provisional patent application Ser. No. 61/557,719 entitled METHOD AND APPARATUS FOR RAMAN CROSS-TALK MITIGATION INTO VIDEO, filed Nov. 9, 2011, the entire contents of each are herein incorporated by reference.

TECHNICAL FIELD

Example embodiments provide a method and apparatus of reducing the amount of Raman cross-talk occurring on data content channels, such as video channels in optical networking systems.

BACKGROUND

Currently, passive optical network (PON) systems continue to deliver content to homes and offices across the world. Increasing bandwidth and data content demands have caused newer signaling protocols and corresponding data speeds to emerge. Interference signaling and signal degradation remains a known concern in PONS and next generation gigabit (XG) PON-type systems. In one example, Raman cross-talk is believed to occur from lower wavelengths into higher wavelengths. For instance, a GPON operating at 1490 nm may cause Raman cross-talk into a 1550 nm video overlay service.

One known implementation may include the use of GPON payload scrambling and using a lower GPON transmit power (approximately +5 dBm) to achieve acceptable performance at the optical network termination units (ONTs). Raman cross-talk may also occur at higher wavelengths that traverse into lower wavelengths, such as from 1577 nm into 1550 nm. Though the wavelength spacing is close, which in turn, results in a lower Raman coupling coefficient, the XGPON-1 power spectral density may be reduced since the data rate is 10 Gbps, which implies less power on a per-Hz basis. As a result, the +12.5 dBm optical transmitter power level still results in video service degradation when following transmission over the ODN (i.e., 10-20 km of fiber and splitter loss). The optical input level to an ONT is on the order of −12 dBm. Under these conditions the Raman cross-talk is a significant factor in the recovered carrier-to-noise ratio (CNR), signal-to-noise ratio (SNR), and modulation error ratio (MER) for the first few recovered video channels (55 MHz-120 MHz).

The above-noted performance criteria may be reduced to levels incompatible with network deployment guidelines. In the case of digital video (256 QAM) the bit error rate (BER) may be reduced to unacceptable levels. Unacceptable performance levels impact video customer service by placing impairments or complete loss of recovered video service on some channels. Some known ways to mitigate the Raman cross-talk impact upon the video data include significantly reducing the XGPON-1 overall transmit power level, and using pre-emphasis on the lower video channel modulation applied to the 1550 nm head-end video transmitter.

Reducing the power transmission results in the inability of the XGPON-1 service to have the desired link budget or service distance. Modifying the transmitters requires modifications to existing deployed PON systems and re-configuring thousands of 1550 nm optical video transmitters. As a result, the existing options for reducing Raman cross-talk include unfeasible service restrictions and/or expense and complex upgrades which are commercially unacceptable and may also lead to backwards compatibility issues with existing deployments.

SUMMARY

One example embodiment may include a method of receiving a data signal at an optical line termination (OLT). The method may further provide identifying, by a processor, signal interference in the data signal, modifying, by a processor, a shape of the data signal in the electrical domain, and transmitting, via a transmitter, the modified data signal to at least one optical termination unit (ONT).

Another example embodiment may include an apparatus including a receiver configured to receive a data signal and a processor configured to identify signal interference in the data signal and modify a shape of the data signal in the electrical domain. The apparatus may also include a transmitter configured to transmit the modified data signal to at least one optical termination unit (ONT).

DETAILED DESCRIPTION

It will be readily understood that the components of the present embodiments as generally described and illustrated in the figures herein, may be arranged and designed in a wide variety of different configurations. Thus, the following detailed description of the embodiments of a method, apparatus, and system, as represented in the attached figures, is not intended to limit the scope of the embodiments as claimed, but is merely representative of selected embodiments.

The features, structures, or characteristics of the described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of the example embodiments of the present disclosure, the embodiments may be applied to many types of network data, such as, packet, frame, datagram, etc. For example purposes, the term "message" also includes packet, frame, datagram, and any equivalents thereof. Furthermore, while certain types of messages and signaling are depicted in exemplary embodiments, which are not limited to a certain type of message, and the embodiments are not limited to a certain type of signaling.

Figure 1:
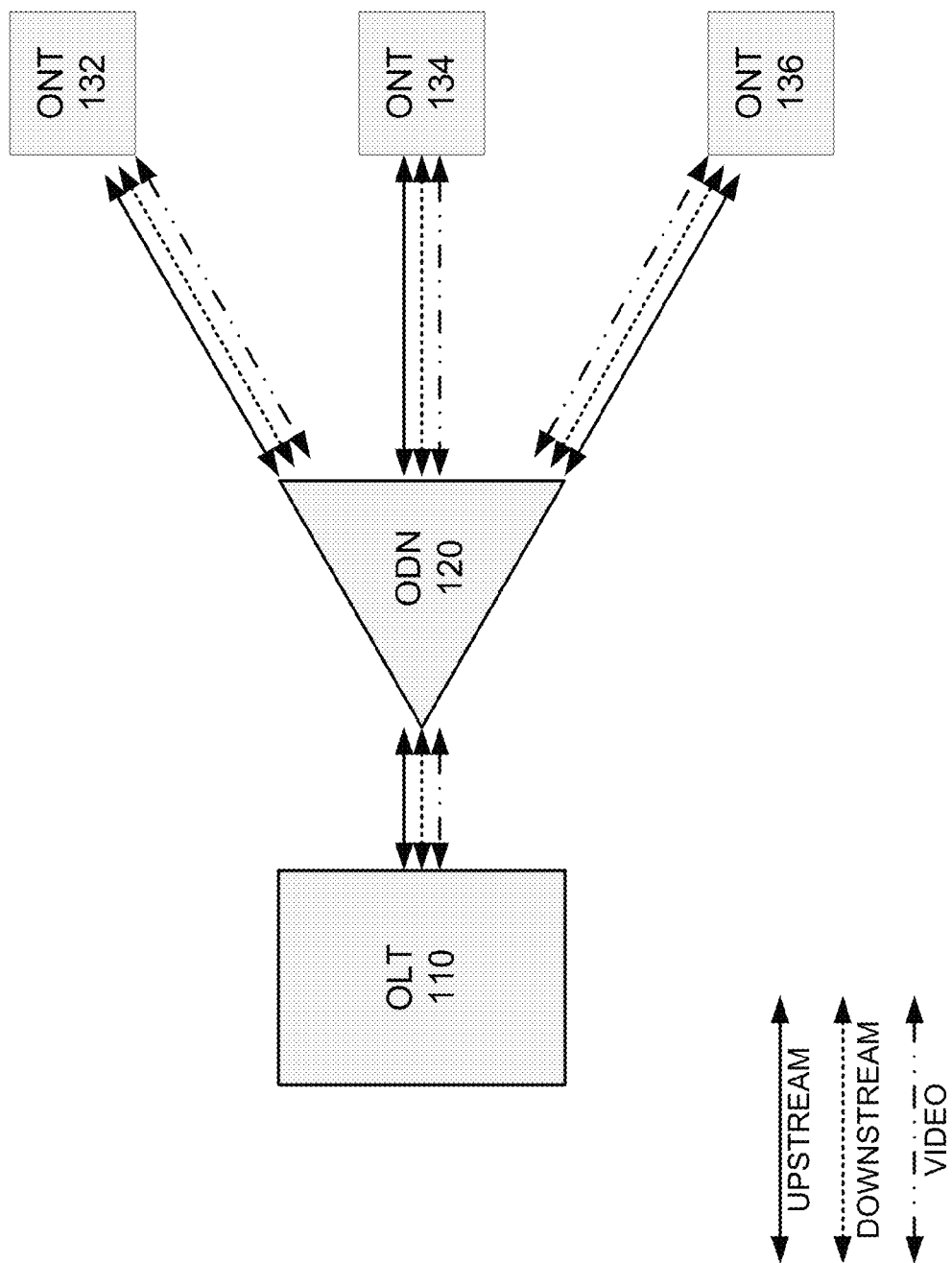
FIG. 1 illustrates an example PON network system according to example embodiments.

FIG. 1 illustrates an example PON configuration according to example embodiments. Referring to FIG. 1, a passive optical network (PON) 100 implementation may include algorithms, hardware and software aimed at offering efficient and optimized PON and next generation gigabit (XG) PON1-type systems. PON technology provides a point-to-multipoint implementation (central office point to multiple termination points) to provide bandwidth, content and other telecommunications services. A PON may include an optical line termination (OLT) 110 located at the central office and multiple units of optical network units (ONTs) 132, 134 and 136 at the customer sites (i.e., offices, homes, etc.). The PON may also include a splitter or optical distribution network (ODN) node 120 that provides data content to the various ONTs.

The International Telecommunications Union (ITU) and the Institute of Electrical and Electronics Engineers (IEEE) have proposed various solutions with respect to PONS in years past. A gigabit-capable PON (GPON) standard provides a sizable amount of total bandwidth and bandwidth efficiency, with a fundamental bandwidth size of 2.488 Gbps of downstream bandwidth and 1.244 Gbps of upstream bandwidth. The GPON standard is widely deployed in many geographical regions.

Example embodiments provide a XGPON-1 type N2B (+12.5 dBm (wavelength 1577 nm) downstream transmit power level) device and/or algorithm which utilizes GPON with a 1550 nm video overlay. Raman cross-talk is known to occur from lower wavelengths into higher wavelengths. For example, in a GPON at 1490 nm Raman cross-talk may be generated into the 1550 nm video overlay service. Example embodiments may provide adding XGPON-1 service on a deployed ODN without impacting the recovered video performance level at the subscriber (ONTs). This implementation would allow a network operator to reduce installation costs and migrate customers to higher bandwidth services with less capital investment.

According to one example embodiment, Raman cross-talk may cause incompatibility between existing and new services at specific frequency spectrum locations and at predictable power levels. By applying de-emphasis to the electrical modulation signal of a 1577 nm transmit laser, it is possible to shape the downstream output optical data signal to reduce the Raman cross-talk level at the critical video frequencies. The shaping of the downstream output optical data signal reduction procedure can be performed so the previously degraded video channels can be acceptably recovered.

According to another example embodiment, the shaping of the downstream output optical data signal may be performed in the digital domain. For example, a binary input data stream may be digitally filtered to create a required pulse shape. The desired output waveform would be converted to an analog waveform by way of a D/A (digital to analog) converter. Another implementation would be to include an analog filter in-between the input data stream and an optical modulator. The ideal filter function would be a limited high-pass function which would reduce the baseband non-return-to-zero (NRZ) spectrum of a XGPON-1 configuration just enough to drop the Raman cross-talk low frequency content to an acceptable recovered video CNR, SNR, and AMR levels. These criteria would be balanced against the reduction in XGPON-1 recovered BER performance and increased jitter. The shaping would mildly impact the 1577 nm XGPON-1 BER while resulting in a significant increase in the 1550 nm recovered video performance.

According to one example method of operation, an optical receiver may be configured to receive a video signal via the optical distribution network node (ODN) from an optical line termination (OLT). The OLT may include a processor configured to identify signal interference in the data signal and modify a shape of the data signal in the electrical domain. The OLT may be configured to transmit the modified data signal to at least one optical termination unit (ONT). In the procedure, the OLT may also be configured to remove Raman cross-talk interference into the video signal such that the data signal is modified and subsequently provided to a transmitter which includes a 1577 nanometer (nm) laser transmitter. The OLT may also be configured to digitally filter the data signal to create a desired pulse shaped signal and convert the pulse shaped signal to an analog waveform via a digital to analog (D/A) converter. Alternatively, the OLT may also filter the data signal by an analog filter set between the input data stream and an optical modulator to remove a low frequency Raman cross-talk interference component and to obtain a limited high pass function with a reduced baseband non-return to zero spectrum of the data signal. The resulting data signal may be a pulse-shaped video signal with a removed low frequency Raman cross-talk interference component in a 1550 nm video channel range.

Figure 2A:
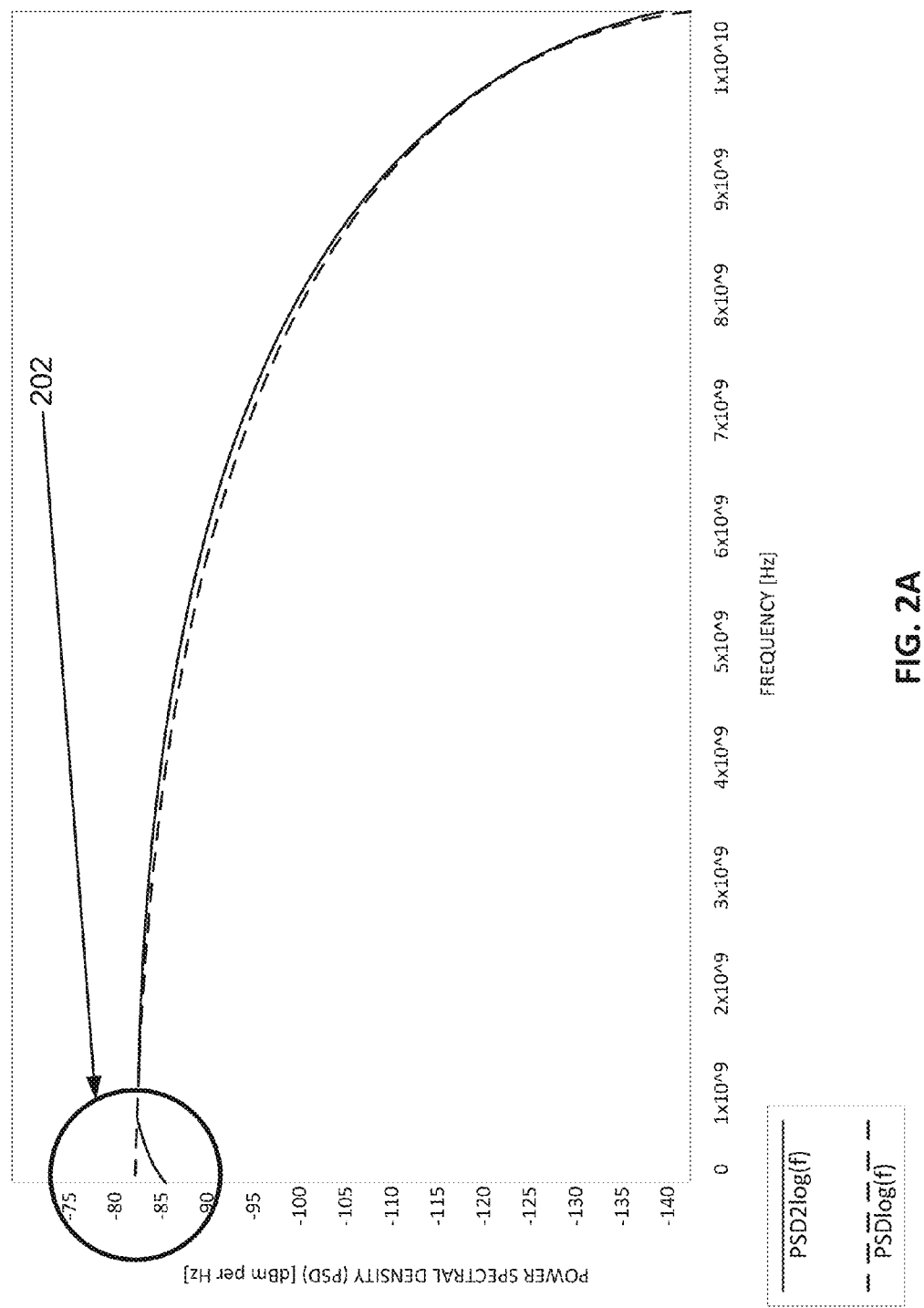
FIG. 2A illustrates an example power spectral density comparison according to example embodiments.

FIG. 2A illustrates an example of a power spectral density graph (PSD) according to example embodiments. The dotted line represents an unshaped or unaltered non-return to zero (NRZ) PSD of a XGPON-1. The solid line, which is above the dotted line except from 0 to about $1 \times 10^{\wedge}9$ Hz, indicates an example of a high pass filtered signal, which in operation would reduce the first few video channel Raman cross-talk levels. This example graph 200 illustrates how the shaped or filtered signal provides a larger power spectral density over the various frequency ranges. Other implementations are possible and results may vary from one implementation to another. The only visible difference between the unshaped and the shaped signals is in the lower frequency range 202.

Figure 2B:
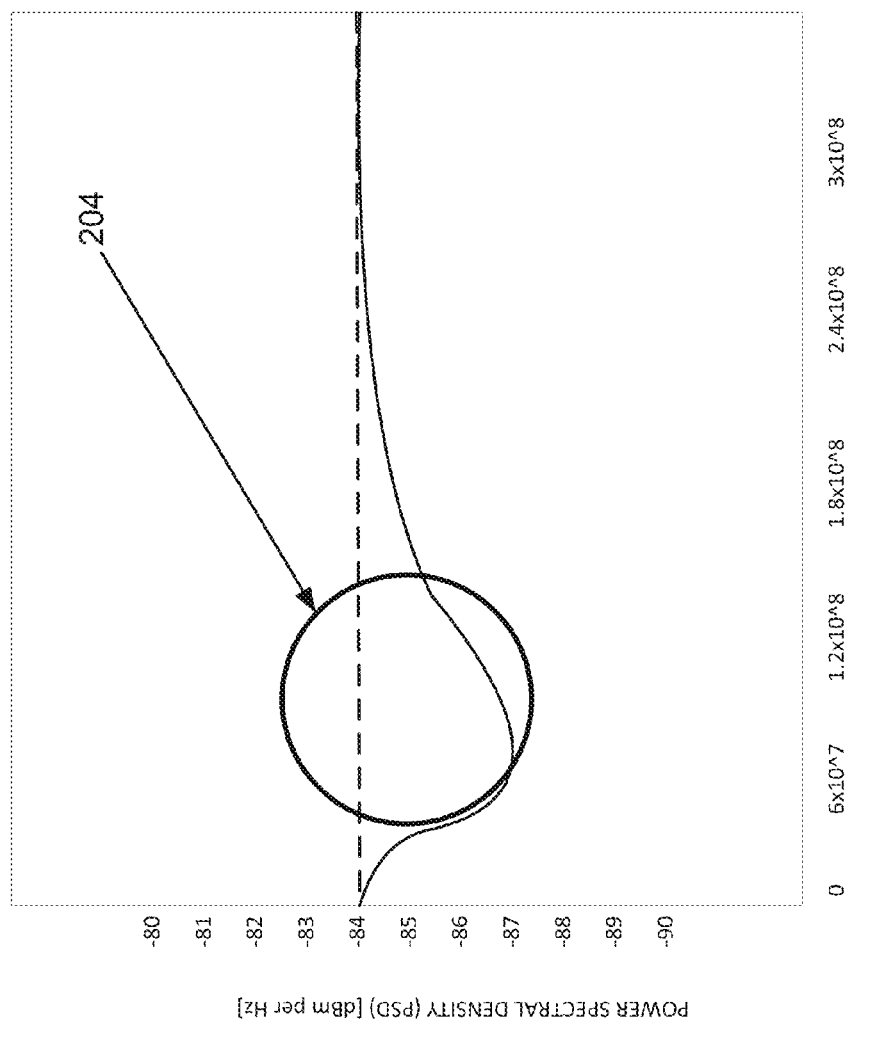
FIG. 2B illustrates an example power spectral density comparison emphasizing a lower frequency range according to example embodiments.
Figure 2C:
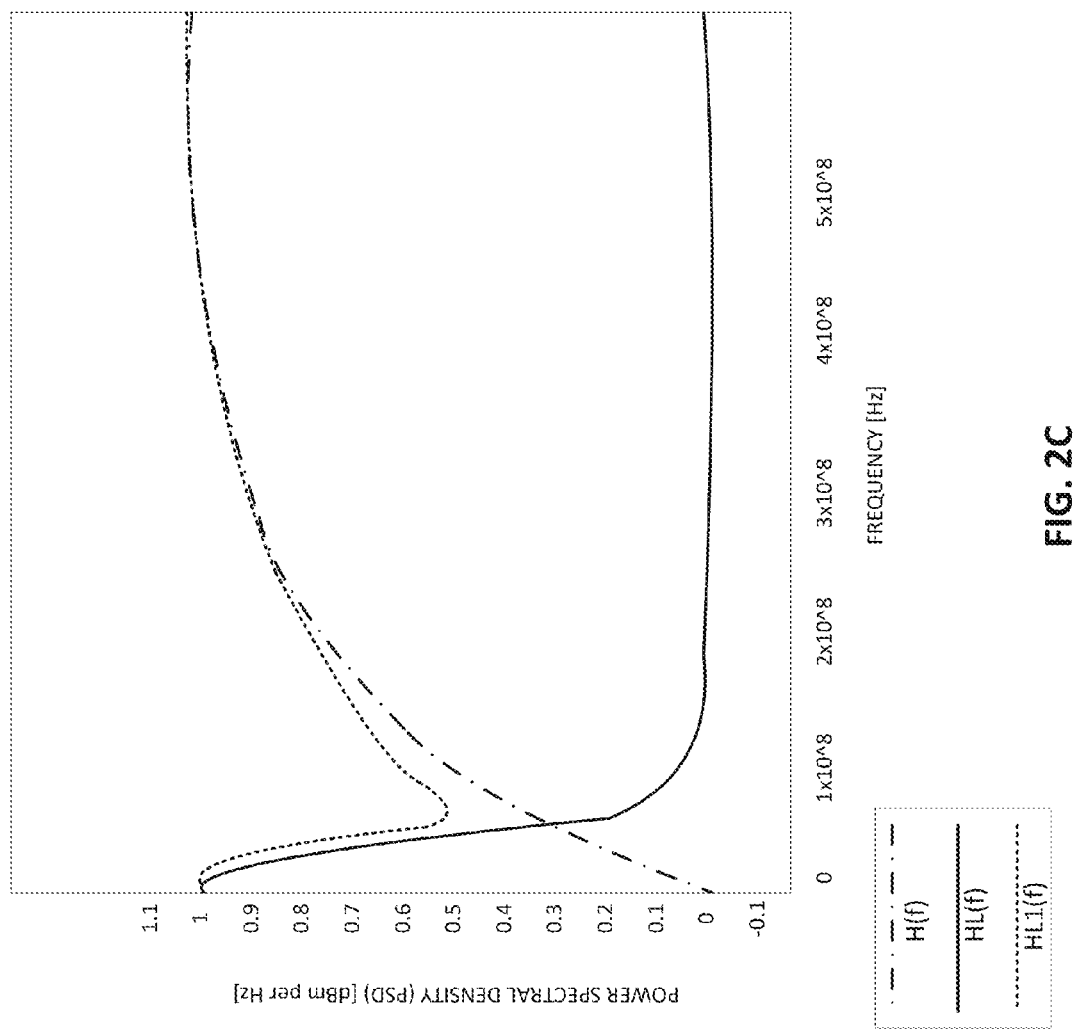
FIG. 2C illustrates a filter response according to example embodiments.

FIG. 2B illustrates an example of a power spectral density graph (PSD) zoomed into the lower frequency range according to example embodiments. Referring to FIG. 2B, the lower frequency range 204 demonstrates a large amount of signal shaping in the lower frequencies while the unshaped signal (dotted line) is kept even without any variations. FIG. 2C illustrates the filter responses for the high-pass filter represented by an alternating dotted and dashed line, the low-pass filter represented by a solid line and the composite/summation of the high-pass filter and the low-pass filter which is the dotted line. The composite band reject shaping approach may reduce the Raman crosstalk by 3 dB in a first video channel.

Raman cross-talk interference with video overlay can occur in various different situations. For example, if the interfering wavelength is smaller than the wavelength of the video content (i.e., 1550-1560 nm), then the offending or interfering wavelength creates or "pumps" interfering signals into the video content frequency range causing distortion of the target signal received at the ONTs. If the interfering wavelength(s) are larger than the video content then by contrast the video signals will "pump" interfering signals into the interfering wavelength range. This scenario may seem negligible, however, the pumping may deplete the video signals power level. The depletion may appear as noise injected into the video signal.

The strength of the signals and fiber distance greatly influence the Raman cross-talk interaction and system/video degradation. Generally, worst case long distance GPON transfers occur in the 9-10 km fiber distance range. Worst case XG-PON1 transfers occur in the 18-20 km fiber distance range. Typically the biggest impacts from Raman cross-talk occur on the 1$^{st}$ handful of video channels. The Raman transfer signals are much stronger with GPON data of the video content. The impact from video into XG-PON1 data is approximately 500% less than the previous scenario. Digital data has a lesser SNR than video. The cross-talk from XG-PON1 into video is also less, however video is more susceptible to cross-talk.

There are various different approaches to Raman cross-talk reduction in video. For example, by using a 2nd feeder fiber for video delivery and implementing 2:n splitters. Also, by applying video signal pre-emphasis and compensating low channel degradation. 10G-TX de-emphasis may also be used to shape or move the energy spectrum. For orthogonal frequency-division multiplexing (OFDM), interfering low-frequency subcarriers can be blanked.

Raman cross-talk could limit co-existence of XGPON-1 in existing deployed PON networks with video overlay, when high performance (i.e., low internal noise) video ONTs are deployed, resulting in degradation of CNR, SNR and MER. An implementation may include altering the data pulse shaping in the electrical domain and applying the pulse into a 1577 nm laser transmitter, which reduces the resulting Raman cross-talk in specific 1550 nm video channels. This implementation may allow coexistence of XGPON-1 and GPON video equipped services in the same ODN node, and ensures that acceptable video CNR, SNR, and MER levels result for the standardized XGPON-1 transmit power levels (up to +12.5 dBm). The implementation allows control of the power penalty impact upon the downstream 1577 nm signals of the XGPON-1 10 Gbps data path. As a result, significant cost and capital savings result by applying this for the network operator.

The operations of a method or algorithm described in connection with the embodiments disclosed herein may be embodied directly in hardware, in a computer program executed by a processor, or in a combination of the two. A computer program may be embodied on a non-transitory computer readable storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 3 illustrates an example network element 300, which may represent any of the above-described components of the previous drawings.

Figure 3:
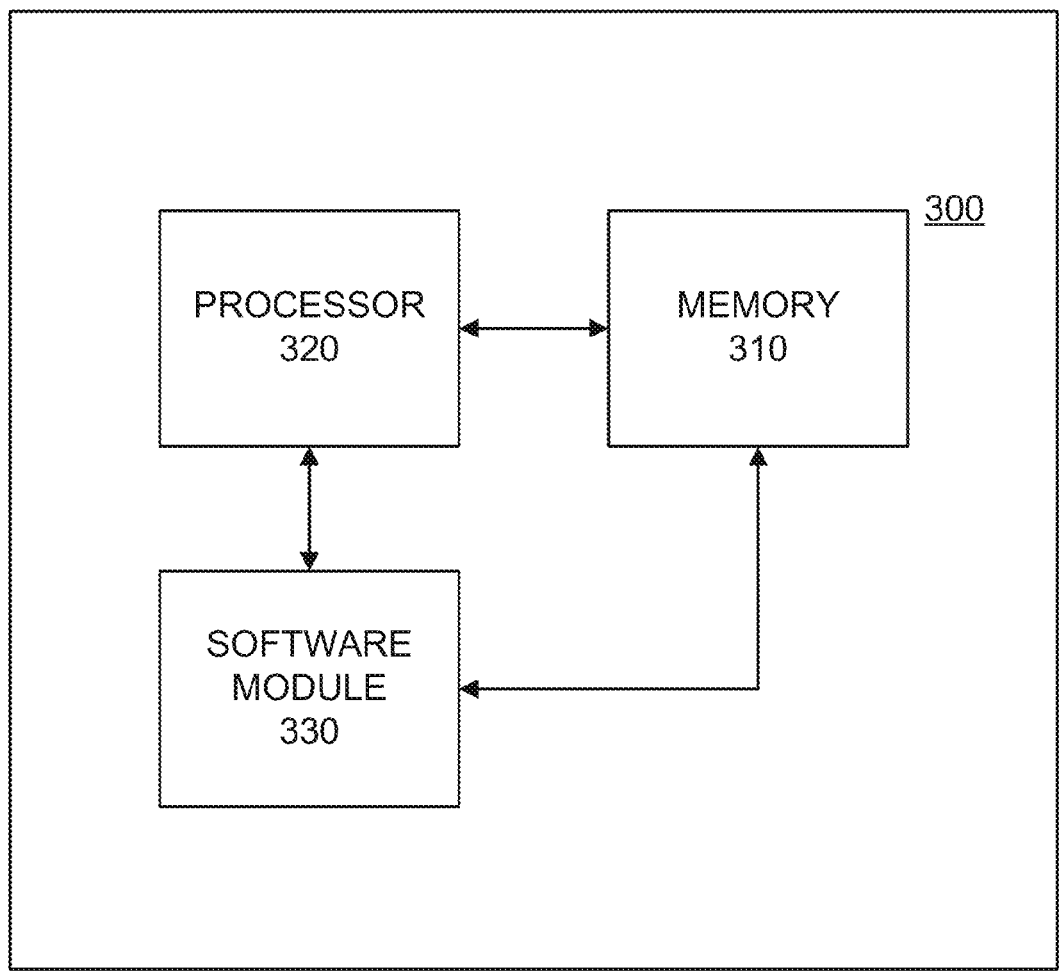
FIG. 3 illustrates an example network entity configured to perform certain operations according to example embodiments.

As illustrated in FIG. 3, a memory 310 and a processor 320 may be discrete components of the network entity 300 that are used to execute an application or set of operations. The application may be coded in software in a computer language understood by the processor 320, and stored in a computer readable medium, such as, the memory 310. The computer readable medium may be a non-transitory computer readable medium that includes tangible hardware components in addition to software stored in memory. Furthermore, a software module 330 may be another discrete entity that is part of the network entity 300, and which contains software instructions that may be executed by the processor 320. In addition to the above noted components of the network entity 300, the network entity 300 may also have a transmitter and receiver pair configured to receive and transmit communication signals (not shown).

Figure 4:
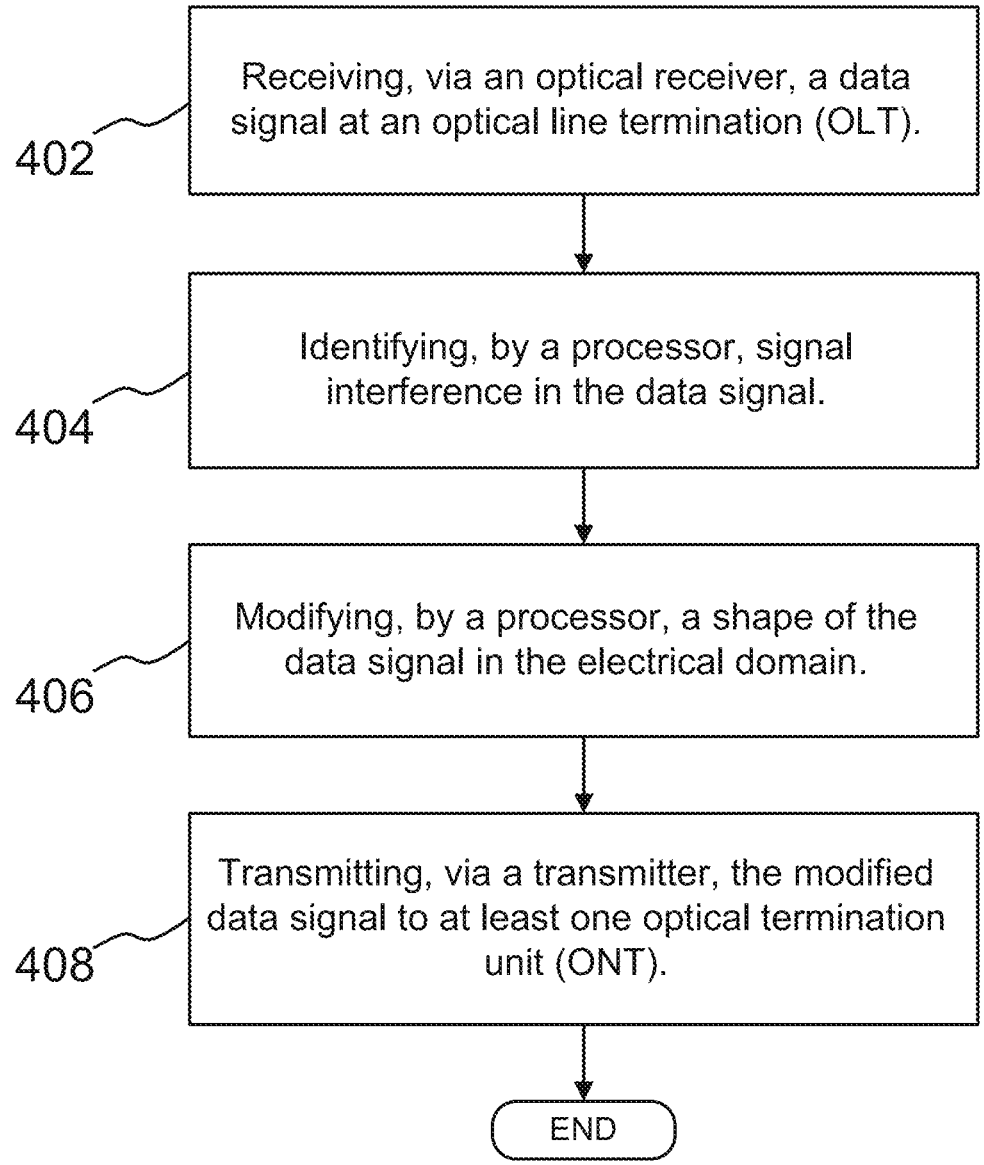
FIG. 4 is a flow diagram of an example method of operation according to an example embodiment.

FIG. 4 illustrates an example flow diagram according to an example embodiment. Referring to FIG. 4, the method may include receiving a data signal at an optical line termination (OLT), at operation 402 and identifying, by a processor, signal interference in the data signal, at operation 404. The method may also include modifying, by a processor, a shape of the data signal in the electrical domain at operation 406 and transmitting, via a transmitter, the modified data signal to at least one optical termination unit (ONT) at operation 408.

Although an exemplary embodiment of the system, method, and computer readable medium of the present embodiments has been illustrated in the accompanied drawings and described in the foregoing detailed description, it will be understood that the embodiments are not limited to the embodiments disclosed, but is capable of numerous rearrangements, modifications, and substitutions without departing from the spirit or scope of the embodiments as set forth and defined by the following claims. For example, the capabilities of the system of FIG. 1 can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred embodiments of the present embodiments have been described, it is to be understood that the embodiments described are illustrative only and the scope of the embodiments is to be defined solely by the appended claims when considered with a full range of equivalents and modifications (e.g., protocols, hardware devices, software platforms etc.) thereto.

What is claimed is:
1. A method, comprising:
  receiving, via an optical receiver, a data signal at an optical line termination (OLT);
  identifying, by a processor, signal interference in the data signal;

filtering the data signal by an analog filter set between an input data stream and an optical modulator to remove a low frequency Raman cross-talk interference component;

obtaining a limited high pass function with a reduced baseband non-return to zero spectrum of the data signal;

modifying, by a processor, a shape of the data signal in the electrical domain to create a desired pulse shaped signal by removing cross-talk interference; and transmitting, via a transmitter, the modified data signal to at least one optical termination unit (ONT).

2. The method of claim 1, wherein removing the cross-talk comprises removing Raman cross-talk interference from the received data signal.

3. The method of claim 1, wherein the modified data signal is provided to a 1577 nanometer (nm) laser transmitter.

4. The method of claim 1, further comprising:
digitally filtering the data signal to create the desired pulse shaped signal; and
converting the pulse shaped signal to an analog waveform via a digital to analog (D/A) converter.

5. The of claim 1, wherein the data signal is a video signal.

6. The method of claim 1, and the removed low frequency Raman crosstalk interference component is in a 1550 ran video channel.

7. An apparatus comprising:
a receiver configured to receive a data signal;
a processor configured to identify signal interference in the data signal, remove cross-talk interference, filter the data signal by an analog filter set between an input data stream and an optical modulator to remove a low frequency Raman cross-talk interference component, obtain a limited high pass function with a reduced baseband non-return to zero spectrum of the data signal, and modify a shape of the data signal in the electrical domain to create a desired pulse shaped signal; and
a transmitter configured to transmit the modified data signal to at least one optical termination unit (ONT).

8. The apparatus of claim 7, wherein the cross-talk interference comprises Raman cross-talk interference.

9. The apparatus of claim 7, wherein the modified data signal is provided to a 1577 nanometer (nm) laser transmitter.

10. The apparatus of claim 7, further comprising:
digitally filtering the data signal to create the desired pulse shaped signal; and
converting the pulse shaped signal to an analog waveform via a digital to analog (D/A) converter.

11. The apparatus of claim 7, wherein the data signal is a video signal.

12. The method of claim 7, and the removed low frequency Raman crosstalk interference component is in a 1550 ran video channel.

13. A non-transitory computer readable storage medium configured to store instructions that when executed causes a processor to perform:
receiving, via an optical receiver, a data signal at an optical distribution network node (ODN);
identifying, by a processor, signal interference in the data signal;
filtering the data signal by an analog filter set between an input data stream and an optical modulator of the ODN to remove a low frequency Raman cross-talk interference component;
obtaining a limited high pass function with a reduced baseband non-return to zero spectrum of the data signal;
modifying, by a processor, a shape of the data signal in the electrical domain to create a desired pulse shaped signal by removing cross-talk interference; and
transmitting, via a transmitter, the modified data signal to at least one optical termination unit (ONT).

14. The non-transitory computer readable storage medium of claim 13, wherein the
cross-talk interference is Raman cross-talk interference.

15. The non-transitory computer readable storage medium of claim 13, wherein the data signal is modified and provided a 1577 nanometer (nm) laser transmitter.

16. The non-transitory computer readable storage medium of claim 13, wherein the processor is further configured to perform:
digitally filtering the data signal to create the desired pulse shaped signal; and
converting the pulse shaped signal to an analog waveform via a digital to analog (D/A) converter.

17. The method of claim 1, wherein the removed low frequency Raman cross-talk interference component is in a 1550 nm video channel associated with the data signal.

* * * * *